United States Patent
Tsujimura et al.

(10) Patent No.: US 9,118,094 B2
(45) Date of Patent: Aug. 25, 2015

(54) BATTERY PACK STRUCTURE FOR ELECTRIC VEHICLES

(75) Inventors: Norihisa Tsujimura, Sagamihara (JP); Toshifumi Takamatsu, Sagamihara (JP); Makoto Iwasa, Chigasaki (JP); Tatsunori Tanigaki, Yamato (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 99 days.

(21) Appl. No.: 14/117,962

(22) PCT Filed: Mar. 21, 2012

(86) PCT No.: PCT/JP2012/057180
§ 371 (c)(1),
(2), (4) Date: Nov. 15, 2013

(87) PCT Pub. No.: WO2012/157332
PCT Pub. Date: Nov. 22, 2012

(65) Prior Publication Data
US 2014/0079977 A1 Mar. 20, 2014

(30) Foreign Application Priority Data
May 17, 2011 (JP) ................................. 2011-110195

(51) Int. Cl.
*H01M 2/00* (2006.01)
*H01M 10/6557* (2014.01)
(Continued)

(52) U.S. Cl.
CPC ........ *H01M 10/5059* (2013.01); *H01M 2/1077* (2013.01); *H01M 2/1083* (2013.01);
(Continued)

(58) Field of Classification Search
CPC .......... H01M 10/425; H01M 10/5004; H01M 10/5016; H01M 10/5059; H01M 10/5065; H01M 2220/20; H01M 2/1077; H01M 2/1083; H01M 2/206
See application file for complete search history.

(56) References Cited

U.S. PATENT DOCUMENTS

2009/0142650 A1 6/2009 Okada et al.
2009/0162737 A1 6/2009 Lai et al.
2011/0297467 A1* 12/2011 Iwasa et al. ................ 180/65.31

FOREIGN PATENT DOCUMENTS

JP 2002-134083 A 5/2002
JP 2002-313440 A 10/2002
(Continued)

OTHER PUBLICATIONS

U.S. Appl. No. 14/117,977, filed Nov. 15, 2013, Tsujimura et al.

*Primary Examiner* — Patrick Ryan
*Assistant Examiner* — Ben Lewis
(74) *Attorney, Agent, or Firm* — Foley & Lardner LLP

(57) ABSTRACT

In a battery pack structure for electric vehicles that battery modules and a controller for battery management are mounted in a battery-pack-case internal space, a first one of clearances, ensured when the battery modules are mounted in the case internal space, which first clearance extends in a first direction, is configured as a first temperature-adjustment air passage, and the second clearance, located downstream of the first temperature-adjustment air passage and extending in a second direction different from the first direction, is configured as a second temperature-adjustment air passage. The controller is arranged at a position facing the second temperature-adjustment air passage. A harness for connecting between each detection line terminal from the battery modules and the controller, and one end of the harness, which harness end is configured as harness terminals connected to the respective detection line terminals, are wired along and arranged in the second temperature-adjustment air passage.

5 Claims, 8 Drawing Sheets

(51) Int. Cl.
*H01M 2/10* (2006.01)
*H01M 2/20* (2006.01)
*H01M 10/42* (2006.01)
*H01M 10/625* (2014.01)
*H01M 10/613* (2014.01)
*H01M 10/6562* (2014.01)

(52) U.S. Cl.
CPC ............ *H01M2/206* (2013.01); *H01M 10/425* (2013.01); *H01M 10/5016* (2013.01); *H01M 10/613* (2015.04); *H01M 10/625* (2015.04); *H01M 10/6557* (2015.04); *H01M 10/6562* (2015.04); *H01M 2220/20* (2013.01)

(56) References Cited

FOREIGN PATENT DOCUMENTS

| | | | |
|---|---|---|---|
| JP | 2009-99490 A | 5/2009 | |
| JP | 2009-134900 A | 6/2009 | |
| JP | 2009-193942 A | 8/2009 | |
| JP | 2009-289636 A | 12/2009 | |
| JP | 2010-123298 A | 6/2010 | |
| JP | 2011-6051 A | 1/2011 | |
| JP | 2011-510433 A | 3/2011 | |
| WO | WO 2010098271 * | 2/2010 | ............ B62D 25/20 |
| WO | WO 2010/098270 A1 | 9/2010 | |
| WO | WO 2010/098271 A1 | 9/2010 | |
| WO | WO 2010/136863 A1 | 12/2010 | |

* cited by examiner

Air flow

VIEW B

VIEW C

BATTERY PACK STRUCTURE FOR ELECTRIC VEHICLES

TECHNICAL FIELD

The present invention relates to a battery pack structure in which a plurality of battery modules and a battery controller are mounted in the internal space of a battery pack case.

BACKGROUND ART

In a battery pack for electric vehicles, a plurality of battery modules, each constructed by a battery cell assembly, and a battery controller for battery management are mounted in the internal space of a battery pack case. In such a battery pack, a battery pack structure, in which a plurality of battery modules and a battery controller are connected to each other by means of a heavy-electric harness constructed by heavy-electric wires tied together and a weak-electric harness constructed by weak-electric wires tied together, is well known. One such battery pack structure has been disclosed in Patent document 1.

However, in the battery pack structure disclosed in Patent document 1, the internal space of the battery pack case is classified into three-split rectangular regions, and three battery modules are mounted on the respective rectangular regions. Also, a T-shaped clearance space, defined among sidewalls of the three battery modules, opposed to each other, is used as a harness wiring path. Therefore, when connecting the battery controller and a specified one of the plurality of battery modules, located apart from the battery controller, to each other via a harness, harness-wiring that the harness has to be bent along the bent clearance path is required. This leads to the problem, such as the deteriorated workability of the harness wiring and the lowered durability of the harness.

On the other hand, the clearances, ensured when the plurality of battery modules have been mounted in the internal space of the battery pack case, are also used as temperature-adjustment air passages through which temperature-adjusting air for battery-temperature management flows. In this manner, the clearances, ensured when the plurality of battery modules have been mounted, serve as the temperature-adjustment air passages and also serve as the harness wiring paths. Hence, the bent harness, which may disturb the temperature-adjusting air flow, has to be wired in the clearances through which the temperature-adjusting air flows. As a result of this, there is a problem that such a bent harness acts as passage resistance and thus smooth flow of temperature-adjusting air cannot be ensured.

CITATION LIST

Patent Literature

Patent document 1: PCT International Publication No. WO2010/098271 (A1)

SUMMARY OF INVENTION

It is, therefore, in view of the previously-described drawbacks of the prior art, an object of the invention to provide a battery pack structure for electric vehicles in which smooth flow of temperature-adjusting air can be ensured, while improving the harness-wiring workability and the harness durability in the harness connection of a plurality of battery modules and a battery controller.

In order to accomplish the aforementioned and other objects, according to the battery pack structure for electric vehicles of the present invention, in mounting a plurality of battery modules, each constructed by a battery cell assembly, and a battery controller for battery management in the internal space of a battery pack case, a first one of a plurality of clearances, ensured when the plurality of battery modules are mounted in the internal space of the battery pack case, which first clearance extends in a first direction, is configured as a first temperature-adjustment air passage through which temperature-adjusting air flows, and a second one of the clearances, which second clearance is located downstream of the first temperature-adjustment air passage and extends in a second direction different from the first direction, is configured as a second temperature-adjustment air passage through which the temperature-adjusting air flows. Additionally, the battery controller is arranged at a position facing the second temperature-adjustment air passage. Furthermore, a harness for connecting between each detection line terminal from the plurality of battery modules and the battery controller, and one end of the harness, which harness end is configured as harness terminals connected to the respective detection line terminals, is wired along and arranged in the second temperature-adjustment air passage.

Therefore, when connecting the plurality of battery modules and the battery controller to each other via the harness, only the work of simplified harness-wiring (simplified harness-routing) along the second temperature-adjustment air passage is required. For the reasons discussed above, it is possible to improve both the harness-wiring workability and the harness durability, as compared to the harness wiring in the bent path.

Furthermore, the harness, wired along the second temperature-adjustment air passage, is configured as a straight harness extending straight along the flow of temperature-adjusting air flowing through the second temperature-adjustment air passage. Thus, it is possible to suppress the passage resistance low, as compared to the bent-harness routing which may disturb the temperature-adjusting air flow. Hence, it is possible to ensure smooth flow of temperature-adjusting air.

As a result of this, when connecting the plurality of battery modules and the battery controller to each other via the harness, it is possible to ensure smooth flow of temperature-adjusting air, while improving both the harness-wiring workability and the harness durability.

DESCRIPTION OF EMBODIMENTS

Figure 1:
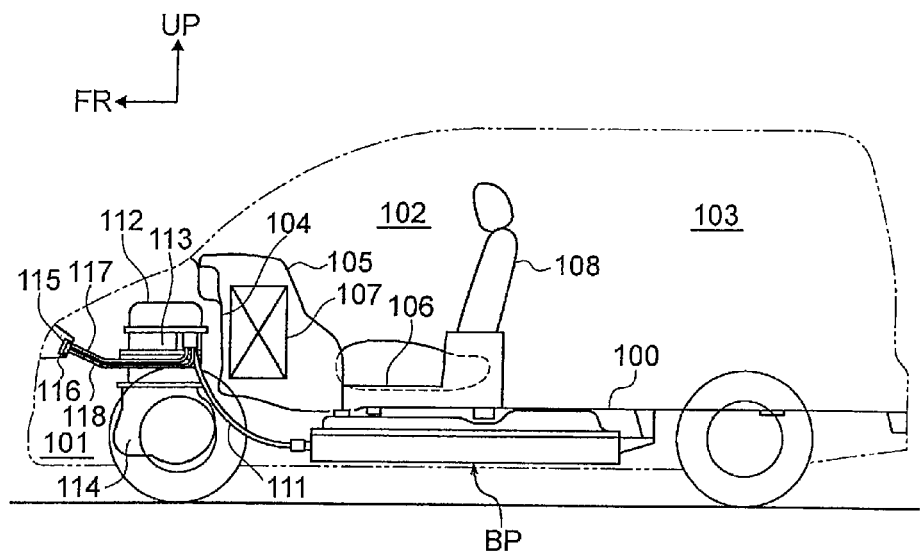
FIG. 1 is a schematic side view illustrating one-box type of electric vehicle, on which a battery pack BP that adopts a structure of the first embodiment is mounted.

Preferred embodiments that realize a battery pack structure for electric vehicles, made according to the invention, are hereinafter described in detail in reference to the first embodiment shown in the drawings.

First, the constructions/configurations of the battery pack structure for electric vehicles in the first embodiment are divided into "MOUNTING CONSTRUCTION OF BATTERY PACK BP", "PACK COMPONENTS OF BATTERY PACK BP", "REGION-PARTITIONING CONFIGURATION FOR CASE INTERNAL SPACE OF BATTERY PACK BP", "CONFIGURATION OF BUS-BAR CONNECTION OF BATTERY HEAVY-ELECTRIC CIRCUIT", and "CONFIGURATION OF HARNESS-CONNECTION AMONG PACK COMPONENTS", and explained every divided constructions/configurations.

[Mounting Construction of Battery Pack BP]

Figure 2:
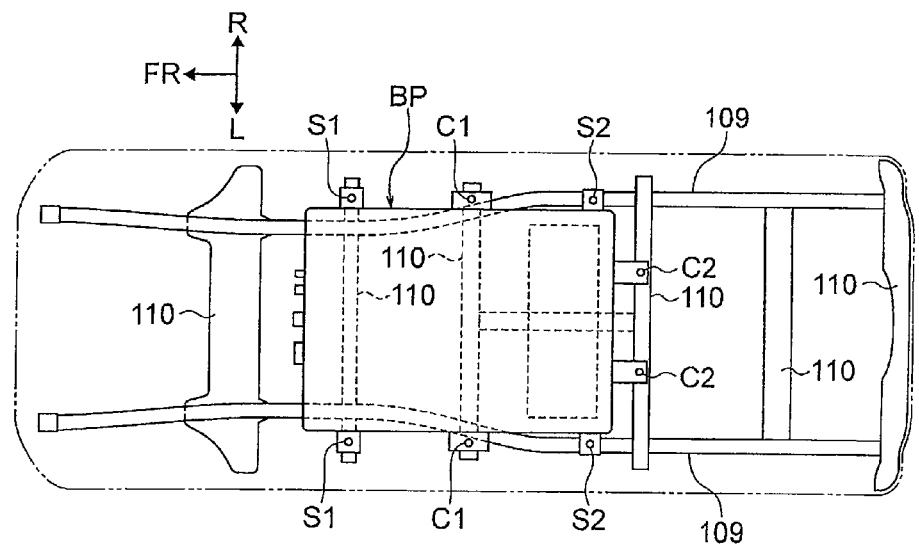
FIG. 2 is a schematic bottom view illustrating the same electric vehicle, on which the battery pack BP that adopts the structure of the first embodiment is mounted.

Referring to FIGS. 1-2, there are shown the schematic side view and the schematic bottom view, illustrating one-box type of electric vehicle, on which the battery pack BP that adopts the structure of the first embodiment is mounted. The mounting construction of the battery pack BP is hereunder explained in reference to FIGS. 1-2.

As shown in FIG. 1, battery pack BP is located underside of a vehicle-body floor 100 and arranged at a central position of the wheelbase. Vehicle-body floor 100 is provided to extend from a position connected to a dash panel 104, by which a motor room 101 and a vehicle compartment 102 are defined, to a position of the rear end of the vehicle to which a cargo room 103 configured to communicate with the vehicle compartment 102 is ensured. The vehicle-body floor is formed into a flat shape throughout its entire length from the front of the vehicle to the rear. Vehicle compartment 102 is provided with an instrument panel 105, a center console box 106, an air-conditioning unit 107, and a vehicle-occupant seat 108.

As shown in FIG. 2, battery pack BP is supported at eight points by means of a body member serving as a vehicle-body strengthening member. The body member is constructed by a pair of side members 109, 109 extending in the fore-and-aft direction of the vehicle, and a plurality of cross members 110, 110, . . . by which the side members are connected to each other in the vehicle width direction. Both sides of battery pack BP are supported at six points by means of a pair of first side member support points S1, S1, a pair of first cross member support points C1, C1, and a pair of second side member support points S2, S2. The rear end of battery pack BP is supported at two points by means of a pair of second cross member support points C2, C2.

Returning to FIG. 1, battery pack BP is connected to an heavy-electric module 112 (a DC/DC converter+a battery charger) located in the motor room 101 via a charging/discharging harness 111 wired straight along the dash panel 104 in the fore-and-aft direction of the vehicle. In addition to the heavy-electric module 112, an inverter 113 and a motor drive unit 114 (a drive motor for running+a reduction gear+a differential gear) are also provided in the motor room 101. A quick-charging port 115 with a charging-port lid and a normal-charging port 116 with a charging-port lid are provided at the anterior part of the vehicle. Quick-charging port 115 and heavy-electric module 112 are connected to each other via a quick-charging harness 117. Normal-charging port 116 and heavy-electric module 112 are connected to each other via a normal-charging harness 118.

Battery pack BP is connected to an air-conditioning system employing the air-conditioning unit 107 located in the instrument panel 105. That is to say, an internal temperature in the battery pack BP, in which battery modules (described later) are mounted, is managed or controlled by temperature-adjusting air (cold air and/or hot air). By the way, cold air is created by introducing refrigerant from the air-conditioning system by way of a branch refrigerant pipe. On the other hand, hot air is created by operating a PTC (positive temperature coefficient) heater incorporated in the air-conditioning system via a PTC harness.

Battery pack BP is connected to an external electronic control system via a bidirectional communication line such as a CAN (controller area network) cable. That is to say, regarding the battery pack BP, discharging control (power-running control) and/or charging control (quick-charging control, normal-charging control, regenerative control, and the like) of each of the battery modules is carried out by unified control based on information exchange with the external electronic control system.

[Pack Components of Battery Pack BP]

Referring to FIGS. 3-6, there is shown the detailed construction of battery pack BP of the first embodiment. Pack components of battery pack BP are hereunder explained in reference to FIGS. 3-6.

Figure 3:
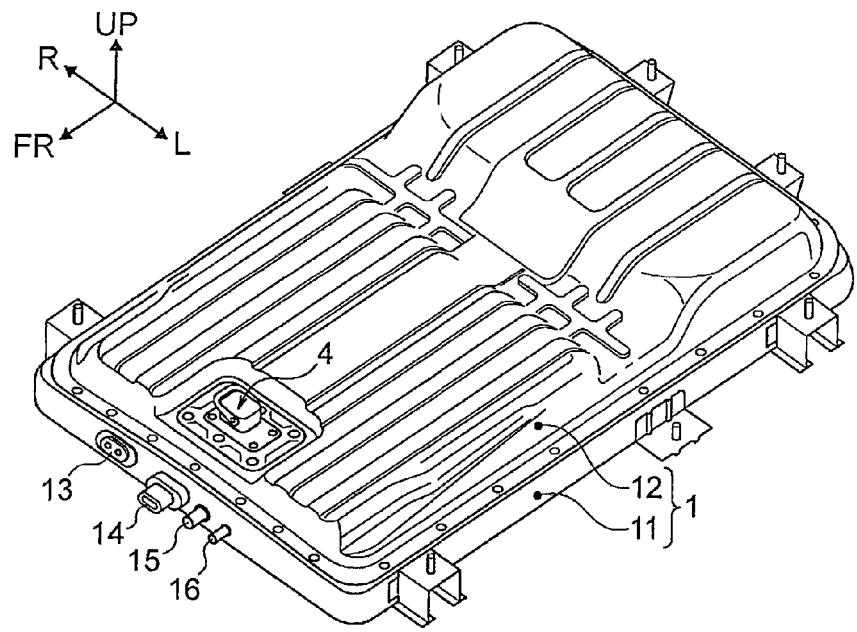
FIG. 3 is a whole perspective view illustrating the battery pack BP of the first embodiment.
Figure 4:
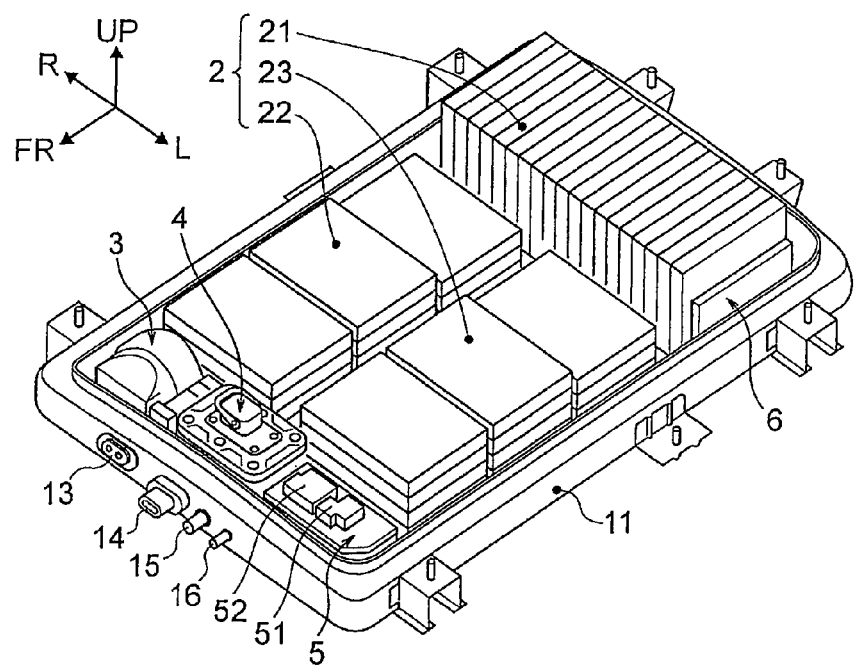
FIG. 4 is a perspective view illustrating the battery pack BP of the first embodiment, under a state where a battery-case upper cover is removed.

As shown in FIGS. 3-4, battery pack BP of the first embodiment is provided with a battery pack case 1, a battery module 2, a temperature-adjustment air unit 3, a service-disconnect switch 4 (hereinafter is referred to as "SD switch"), a junction box 5, and a lithium-ion battery controller 6 (hereinafter is referred to as "LB controller").

As shown in FIGS. 3-4, the above-mentioned battery pack case 1 is constructed by two parts, namely, a battery pack lower frame 11 and a battery pack upper cover 12.

As shown in FIG. 4, battery pack lower frame 11 is a frame member fixedly mounted and supported on the body member. Battery pack lower frame 11 has a substantially square recessed mounting space for mounting the battery module 2 and the other pack components 3, 4, 5, and 6. A refrigerant pipe connector terminal 13, a weak-electric connector terminal 16, a charging/discharging connector terminal 14, and a heavy-electric connector terminal 15 for heavy-current supply to the vehicle-compartment air-conditioning unit are installed onto the front end edge of the battery pack lower frame 11.

As shown in FIG. 3, battery pack upper cover 12 is a cover member bolted onto the outer periphery of the battery pack lower frame 11. Battery pack upper cover 12 has a concavo-convex stepped cover contour surface configured to be conformable to concavo-convex height shapes of the pack components 2, 3, 4, 5, and 6 mounted in the battery pack lower frame 11, in particular, concavo-convex height shapes of the battery module 2.

Figure 5:
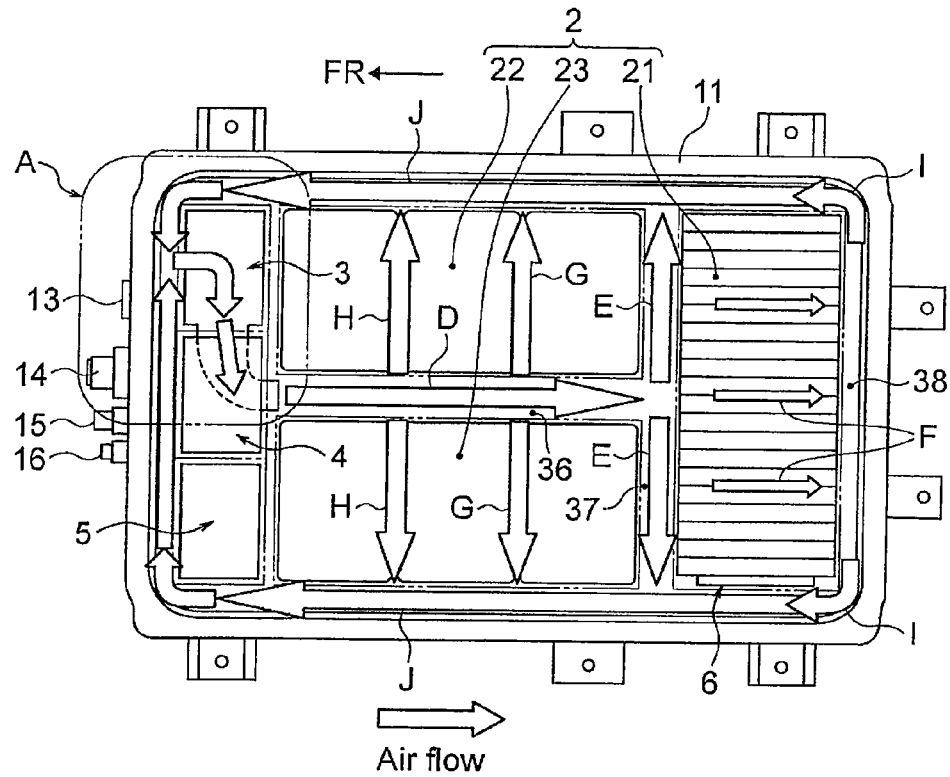
FIG. 5 is a plan view illustrating the internal structure of the battery pack BP of the embodiment and the flow of temperature-adjusting air under a state where the battery-case upper cover is removed.

As shown in FIGS. 4-5, battery module 2 is mounted on the battery pack lower frame 11, and constructed by three-split modules, that is, a first battery module 21, a second battery module 22, and a third battery module 23. Each of battery modules 21, 22, and 23 has a battery-cell assembly structure constructed by a plurality of battery cells stacked. Each battery cell is a secondary battery (e.g., a lithium-ion battery or the like). The detailed configuration of each of battery modules 21, 22, and 23 is as follows.

As shown in FIGS. 4-5, the first battery module 21 is mounted in a rearward region of the battery pack lower frame 11 on the vehicle. Regarding the first battery module 21, a rectangular battery cell, whose thickness is thin, is used as a unit cell, and then a plurality of battery cells, stacked in the direction of thickness, are prepared. The first battery module has an upright-stacked configuration (for example, 20 pieces of battery cell, upright-stacked) in which the battery cells are mounted such that the direction of stack of the battery cells and the vehicle width direction accord with each other.

As shown in FIG. 4, the second battery module 22 and the third battery module 23 are configured as a pair of modules, which are split into left and right battery modules in the vehicle width direction, and mounted in a central region of the battery pack lower frame 11 on the vehicle and located in front of the first battery module 21. Each of the second battery module 22 and the third battery module 23 has a flat-stacked configuration of the same pattern. That is, a rectangular battery cell, whose thickness is thin, is used as a unit cell, and then a plurality of battery cells, (for example, 4 or 5 pieces) stacked in the direction of thickness, are prepared, and a plurality of sets of stacked battery cells (for example, one set of 4 pieces of stacked battery cell, and two sets of 5 pieces of stacked battery cell) are prepared. These sets of stacked battery cells are prepared as a flat-stacked state where the direction of stack of the battery cells and the vehicle-body vertical direction accord with each other. For instance, one set of 4 pieces of flat-stacked battery cell, one set of 5 pieces of flat-stacked battery cell, and the other set of 5 pieces of flat-stacked battery cell are aligned with each other in the fore-and-aft direction of the vehicle from the front of the vehicle to the rear, in that order. In this manner, each of the second and third battery modules has a flat-stacked configuration.

Figure 6:
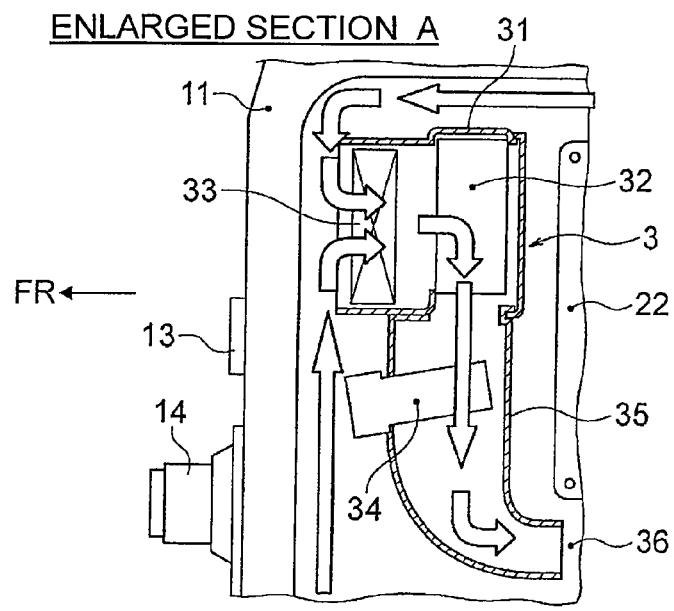
FIG. 6 is an enlarged view of the section A of FIG. 5, showing the configuration of a temperature-adjustment air unit of the battery pack BP of the first embodiment and the flow of temperature-adjusting air.

As shown in FIG. 5, temperature-adjustment air unit 3 is located in a right-hand region of the forward space of the battery pack lower frame 11 on the vehicle, for sending temperature-adjusting air (cold air and/or hot air) to temperature-adjustment air passages of battery pack BP. As shown in FIG. 6, temperature-adjustment air unit 3 is constructed to have a unit case 31, a blower fan 32, an evaporator 33, a PTC (positive temperature coefficient) heater 34, and a temperature-adjusting air duct 35. By the way, refrigerant is introduced into the evaporator 33 via the refrigerant pipe connector terminal 13 installed onto the front end edge of the battery pack lower frame.

As shown in FIGS. 3-4, SD switch 4 is located in a central region of the forward space of the battery pack lower frame 11 on the vehicle, for mechanically cut off the battery heavy-electric circuit by manual operation. When inspecting, repairing, replacing components such as heavy-electric module 112, inverter 113, and the like, switching between OFF and OFF states of the SD switch 4 can be manually operated.

As shown in FIGS. 3-4, junction box 5 is located in a left-hand region of the forward space of the battery pack lower frame 11 on the vehicle, for intensively performing supply, interception, and distribution of heavy-electric current by means of a relay circuit. A temperature-adjustment relay 51 and a temperature-adjustment controller 52, both provided to control the temperature-adjustment air unit 3, are added to the junction box 5.

As shown in FIGS. 4-5, LB controller 6 is located at a position corresponding to the left end face of the first battery module 21, for performing capacity-management, temperature-management, and voltage-management for each of battery modules 21, 22, 23. LB controller 6 is configured to acquire battery-capacity information, battery-temperature information, and battery-voltage information by arithmetic processing based on temperature detection signals from temperature detection signal lines, battery voltage detection signals from battery voltage detection lines, and a battery current detection signal from a battery current detection line.

[Region-Partitioning Configuration for Case Internal Space of Battery Pack BP]

Figure 7:
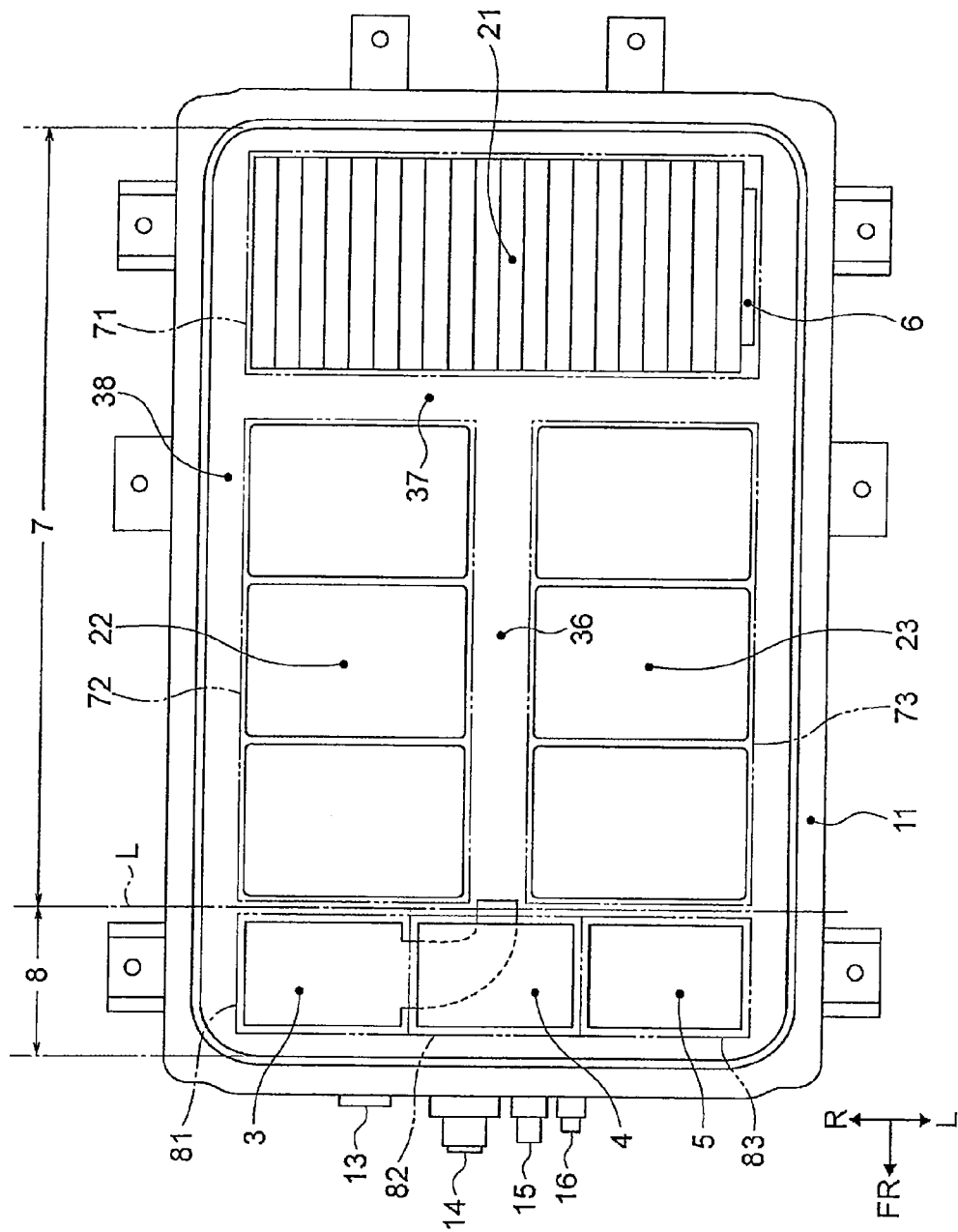
FIG. 7 is a plan view illustrating the region-partitioning configuration for the case internal space of the battery pack BP of the first embodiment.

FIG. 7 is the plan view illustrating the region-partitioning configuration for the case internal space of battery pack BP of the first embodiment. The region-partitioning configuration for the case internal space of battery pack BP is hereunder explained in reference to FIG. 7.

As shown in FIG. 7, regarding the battery pack BP of the first embodiment, the internal space of battery pack case 1 is partitioned into two regions in the fore-and-aft direction of the vehicle, namely, a vehicle rearward battery module mounting region 7 and a vehicle forward electrical equipment mounting region 8 by a boundary line L drawn in the vehicle width direction. Battery module mounting region 7 occupies most of the case internal space, ranging from the rearward end of the case on the vehicle to the boundary line L near the forward end. Electrical equipment mounting region 8 occupies a narrow region, which is narrower than the battery module mounting region 7 and ranges from the forward end of the case on the vehicle to the boundary line L near the forward end.

Battery module mounting region 7 is classified into three-split rectangular regions, namely, a first split rectangular region 71, a second split rectangular region 72, and a third split rectangular region 73, by a T-shaped passage (a central passage 36 and an intersecting passage 37). The first battery module 21, which has the LB controller 6 attached to one side face, is mounted in the first split rectangular region 71. The second battery module 22 is mounted in the second split rectangular region 72. The third battery module 23 is mounted in the third split rectangular region 73.

Electrical equipment mounting region 8 is classified into three partitioned regions in the vehicle width direction, namely, a first partitioned region 81, a second partitioned region 82, and a third partitioned region 83. Temperature-adjustment air unit 3 is mounted within an area ranging from the first partitioned region 81 to the lower part of the second partitioned region 82. SD switch 4 is mounted in the upper part of the second partitioned region 82. Junction box 5 is mounted in the third partitioned region 83.

Temperature-adjustment air passages for internal circulation of temperature-adjusting air, created by temperature-adjustment air unit 3, are configured in the internal space of battery pack BP, utilizing the clearances ensured when battery modules 21, 22, and 23 have been mounted in the respective split rectangular regions. As the temperature-adjustment air passages, the central passage 36 through which temperature-adjusting air, blown off from the temperature-adjustment air unit 3, flows first, the intersecting passage 37 for distributing the flow from the central passage 36 to both sides in the vehicle width direction, and a loop passage 38 for returning the temperature-adjusting air flown into the circumference of the internal space to the temperature-adjustment air unit 3, are provided. Central passage 36 is configured by keeping or defining a clearance between two opposed faces of the second battery module 22 and the third battery module 23. Intersecting passage 37 is configured by keeping or defining a clearance defined between two opposed faces of the first battery module 21 and the second battery module 22 and between two opposed faces of the first battery module 21 and the third battery module 23. Loop passage 38 is configured by keeping or defining a clearance or a margin between the battery pack lower frame 11 and each pack component 2, 3, 4, 5, and 6.

In addition to the three major temperature-adjustment air passages through which temperature-adjusting air flow mainly, that is, the central passage 36, the intersecting passage 37, and the loop passage 38, apertures and clearance spaces defined by mounting the pack components 2, 3, 4, 5, and 6 in the case internal space are also included in the temperature-adjustment air passages. For instance, regarding the first battery module 21, an aperture that is defined between adjacent stacked battery cells, each used as a unit cell, and configured in the same direction as the flow direction of temperature-adjusting air, serves as a temperature-adjustment air passage. Regarding the second battery module 22 and the third battery module 23, a mounting interval defined between one set of 4 pieces of flat-stacked battery cell and one set of 5 pieces of flat-stacked battery cell, and a mounting interval defined between the one set of 5 pieces of flat-stacked battery cell and the other set of 5 pieces of flat-stacked battery cell serve as temperature-adjustment air passages. Regarding the electrical equipment mounting region 8, a clearance space defined between the inside of battery pack upper cover 12 and the outside faces of components such as temperature-adjustment air unit 3 and junction box 5 serves as a temperature-adjustment passage.

[Configuration of Bus-Bar Connection of Battery Heavy-Electric Circuit]

Figure 8:
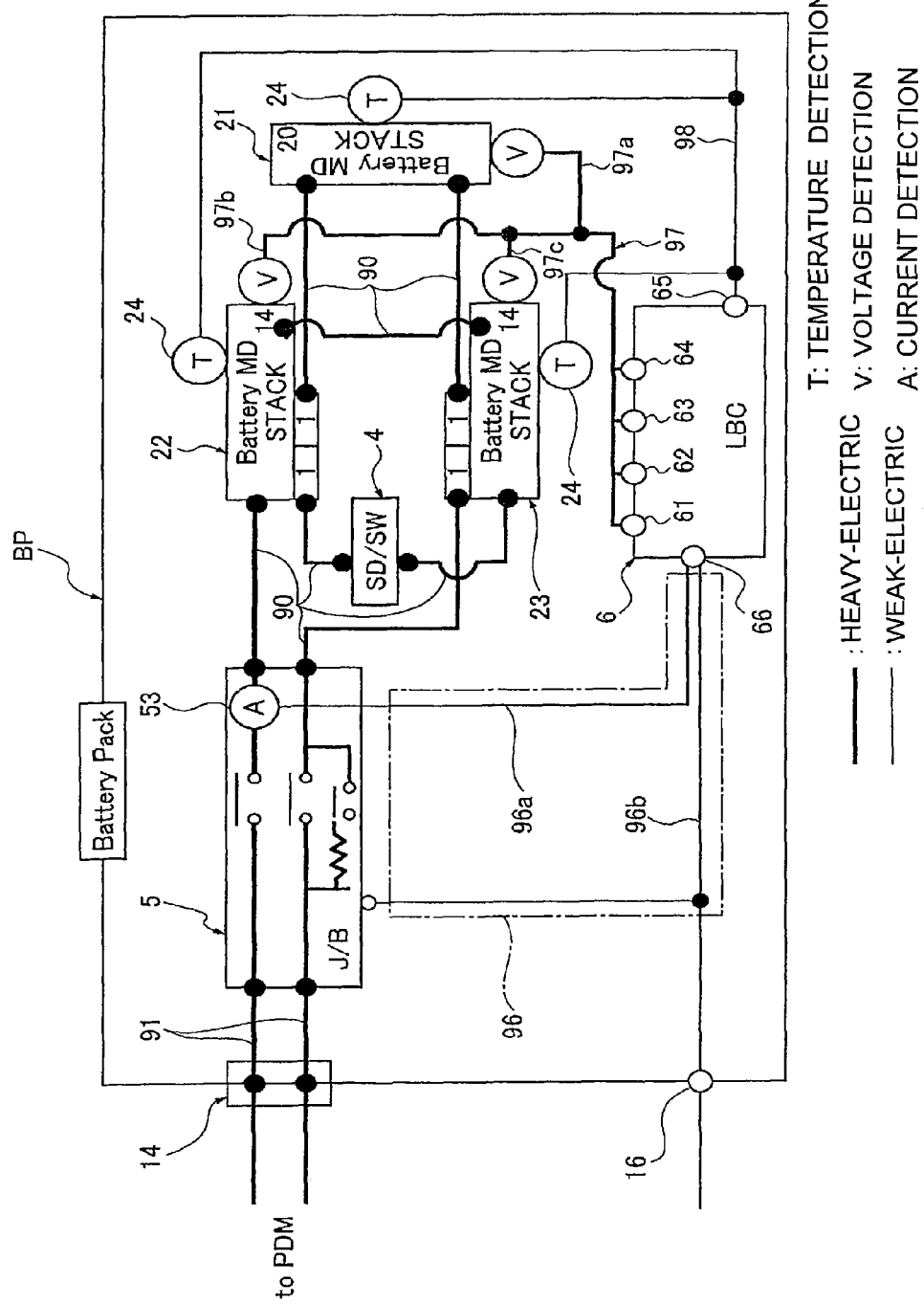
FIG. 8 is a circuit diagram illustrating the configuration of bus-bar connection and the configuration of harness-connection for each pack component in the battery pack BP of the first embodiment.
Figure 9:
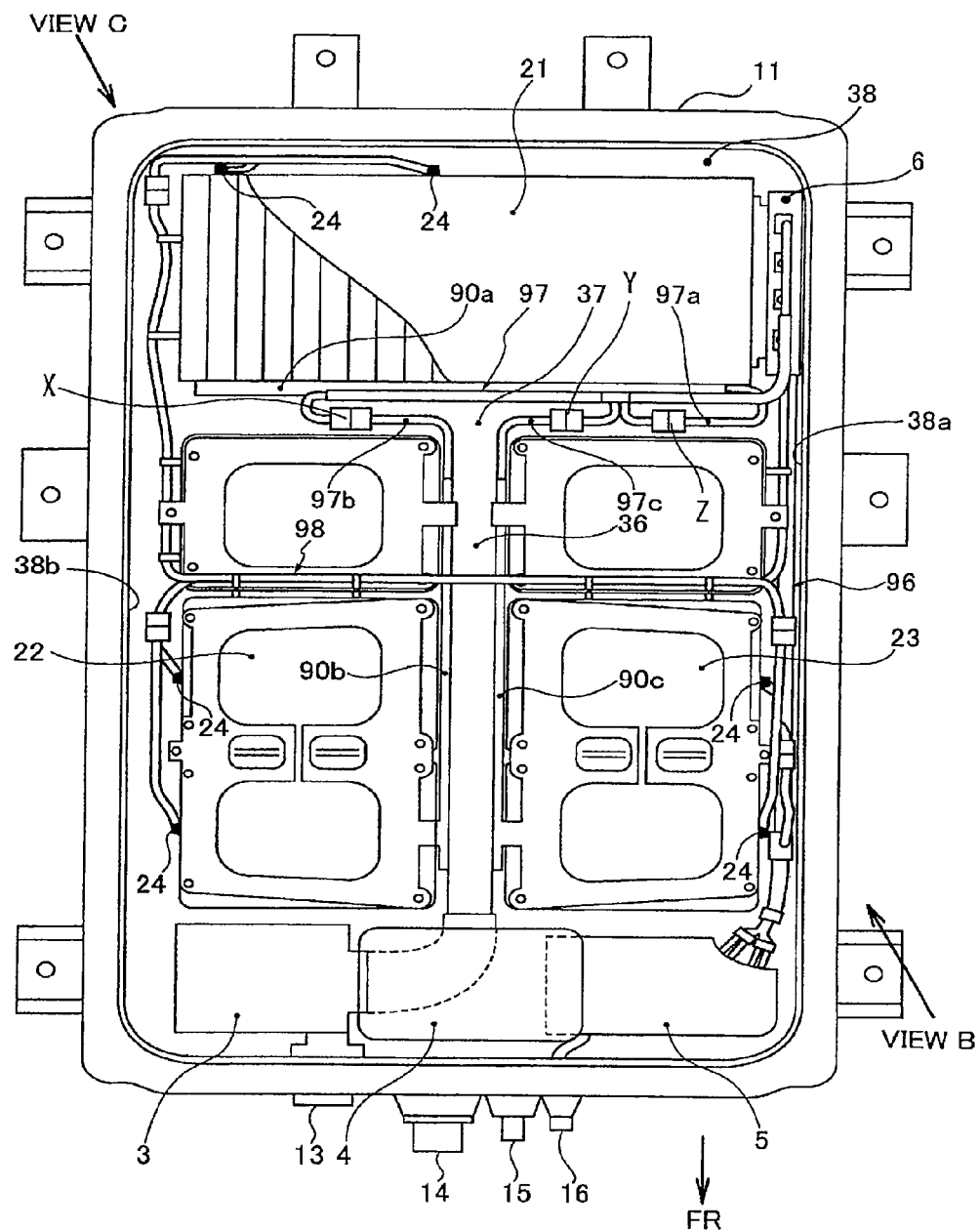
FIG. 9 is a plan view illustrating the configuration of bus-bar connection and the configuration of harness-connection for each pack component in the case internal space of the battery pack BP of the first embodiment.

Referring to FIGS. 8-9, there is shown the configuration of bus-bar connection of the battery heavy-electric circuit in the battery pack structure of the first embodiment. The configuration of bus-bar connection of the battery heavy-electric circuit is hereunder explained in reference to FIGS. 8-9.

As shown in FIG. 8, the battery heavy-electric circuit of battery pack BP of the first embodiment has a bus-bar connection configuration that battery modules 21, 22, and 23, junction box 5, and SD switch 4, each of which is equipped with an internal bus bar (not shown), are connected to each other via an external bus bar 90 (a bus bar). By the way, junction box 5 and charging/discharging connector terminal 14 are connected to each other via a heavy-electric harness 91.

In the above-mentioned battery heavy-electric circuit, the term "internal bus bar" means an electrically conductive plate connected to terminals of a plurality of battery cells constructing each of battery modules 21, 22, and 23. On the other hand, the term "external bus bar 90" means an electrically conductive plate for connecting between terminals of the internal bus bars so as to form or configure a battery heavy-electric circuit (described later). The external bus bar is comprised of a first external bus bar 90a, a second external bus bar 90b, and a third external bus bar 90c. As shown in FIG. 9, the first bus bar 90a is arranged on the side face of the first battery module 21 along the intersecting passage 37. As shown in FIG. 9, the second bus bar 90b and the third bus bar 90c are arranged on the two opposed side faces of the second battery module 22 and the third battery module 23 along the central passage 36.

In the above-mentioned battery heavy-electric circuit, the three-split battery modules 21, 22, and 23 are designed to provide a circuit configuration in which the total number of battery cells (48 pieces) is divided into two-divided battery-cell sets, each having 24 pieces. Junction box 5 and SD switch 4 are connected to each divided battery-cell set via respective bus bars. That is to say, on one hand, the first battery module 21 (20 pieces), the second battery module 22 (2 pieces), and the third battery module 23 (2 pieces) are combined into one battery-cell set (24 pieces in total). On the other hand, the second battery module 22 (14 pieces−2 pieces=12 pieces) and the third battery module 23 (14 pieces−2 pieces=12 pieces) are combined into the other battery-cell set (24 pieces in total).

[Configuration of Harness-Connection Among Pack Components]

Referring to FIGS. 8-11, there is shown the configuration of harness-connection among pack components of the battery pack structure of the first embodiment. The configuration of harness-connection among pack components is hereunder explained in reference to FIGS. 8-11.

As the configuration of harness-connection among pack components of battery pack BP of the first embodiment, a weak-electric harness-connection configuration between junction box 5 and LB controller 6, a heavy-electric harness-connection configuration between battery module 2 and LB controller 6, and a weak-electric harness-connection configuration between battery module 2 and LB controller 6 are provided.

Weak-Electric Harness-Connection Configuration Between Junction Box 5 and LB Controller 6

As shown in FIG. 9, junction box 5 and LB controller 6 are arranged at positions spaced apart from each other and facing a straight passage part 38a, which constructs a part of loop passage 38 of the temperature-adjustment air passages configured in the internal space of battery pack case 1 and extends along one side of the battery pack case. A weak-electric harness 96, via which junction box 5 and LB controller 6 are connected to each other, is wired along the straight passage part 38a configured to extend in the fore-and-aft direction of the vehicle.

Junction box 5 is arranged at the position corresponding to one end of the vehicle width direction of the electrical equipment mounting region 8 and facing the straight passage part 38a.

LB controller 6 is arranged upright at the position corresponding to one end of the vehicle width direction of the first split rectangular region 71, in which the first battery module 21 constructed by a plurality of battery cells upright-stacked in the vehicle width direction is mounted, and facing the straight passage part 38a.

As shown in FIG. 8, weak-electric harness 96 is constructed by binding a battery current detection signal line 96a from a current sensor 53 installed in the junction box 5 and control signal lines 96b from LB controller 6 to the external electronic control system together. Battery current detection signal line 96a is designed to supply information about a battery current changed due to charging/discharging operations to the LB controller 6. Control signal lines 96b are designed to send battery-capacity information, battery-temperature information, and battery-voltage information, all acquired by the LB controller 6, to the external electronic control system. By the way, the relay circuit installed in the junction box 5 is operated (opened or closed) responsively to relay-circuit ON/OFF information sent from the external electronic control system by way of the control signal lines 96b.

Heavy-Electric Harness-Connection Configuration Between Battery Module 2 and LB Controller 6

As shown in FIG. 9, battery module 2 and LB controller 6 are arranged at positions facing the intersecting passage 37 (the common passage part) of the temperature-adjustment air passages configured in the internal space of battery pack case 1, to which common passage part one side face of battery module 21, one side face of battery module 22, and one side face of battery module 23 are exposed together. A heavy-electric harness 97 (a harness) via which LB controller 6 and each of external bus bar 90a, external bus bar 90b, and external bus bar 90c are connected to each other, is wired along the intersecting passage 37 extending in the vehicle width direction. By the way, connectors X, Y, and Z are attached to heavy-electric harness 97. These connectors X, Y, and Z are arranged along the intersecting passage 37.

Heavy-electric harness 97 is constructed by binding a first battery voltage detection line 97a, a second battery voltage detection line 97b, and a third battery voltage detection line 97c together. The first battery voltage detection line 97a is connected to a bus-bar end of the first external bus bar 90a in the vicinity of the LB controller 6. The second battery voltage detection line 97b and the third battery voltage detection line 97c are respectively connected to a bus-bar end of the second external bus bar 90b and a bus-bar end of the third external bus bar 90c in the vicinity of the intersecting passage 37.

Figure 10:
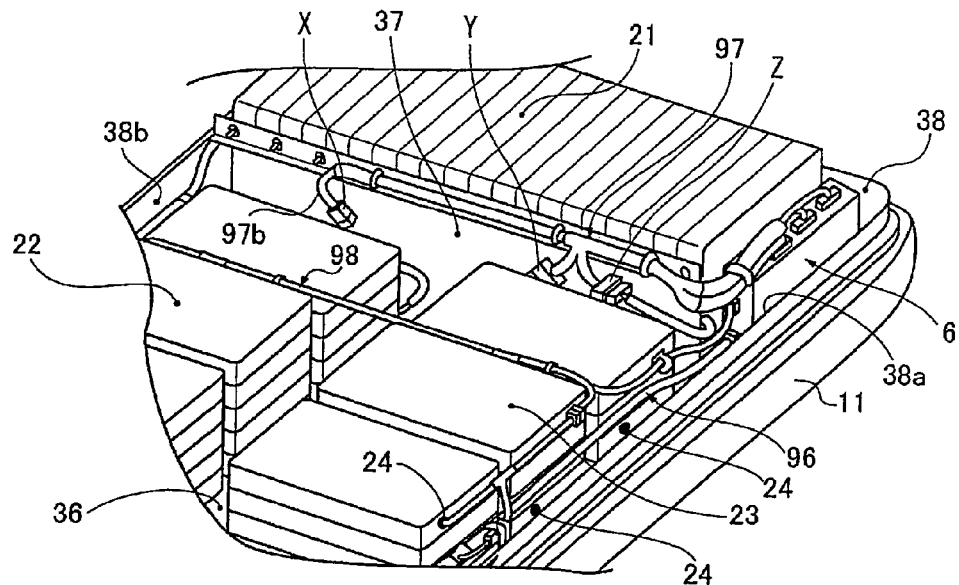
FIG. 10 is a perspective view illustrating the configuration of harness-connection for each pack component in the case internal space of the battery pack BP of the first embodiment, taken in the direction of the arrow B in FIG. 9.

As shown in FIG. 10, heavy-electric harness 97 is wired along a specified one of three opposed side faces of battery modules 21, 22, and 23, opposed to each other with respect to the intersecting passage 37, that is, along the upper part of the side face of the first battery module 21, further protruding upward from the top faces of second and third battery modules 22-23.

Battery voltage detection lines 97a, 97b, and 97c of heavy-electric harness 97 are designed to supply respective battery voltage values of battery modules 21, 22, and 23 to the LB controller 6. LB controller 6 is configured to acquire, based on the supplied battery voltage values, battery-voltage information, and also configured to acquire, based on a characteristic showing the relationship between battery capacities and battery voltage values, battery-capacity information. For instance, a lithium-ion battery has a characteristic that a battery capacity and a battery voltage value vary linearly each other.

Weak-Electric Harness-Connection Configuration Between Battery Module 2 and LB Controller 6

As shown in FIG. 7, battery module 2 and LB controller 6 are arranged in the battery module mounting region 7 of the internal space of battery pack case 1. A weak-electric harness 98, via which LB controller 6 and each of temperature measuring junctions 24 of thermo-couple temperature sensors attached to respective battery modules 21, 22, and 23 are connected to each other, is wired along a wiring route in the case internal space. Used as the wiring route of weak-electric harness 98 are a wiring route configured along two straight passage parts 38a-38b of loop passage 38, both extending in the fore-and-aft direction of the vehicle, and a wiring route configured along the stepped faces of second and third battery modules 22-23 in the vehicle width direction.

Figure 11:
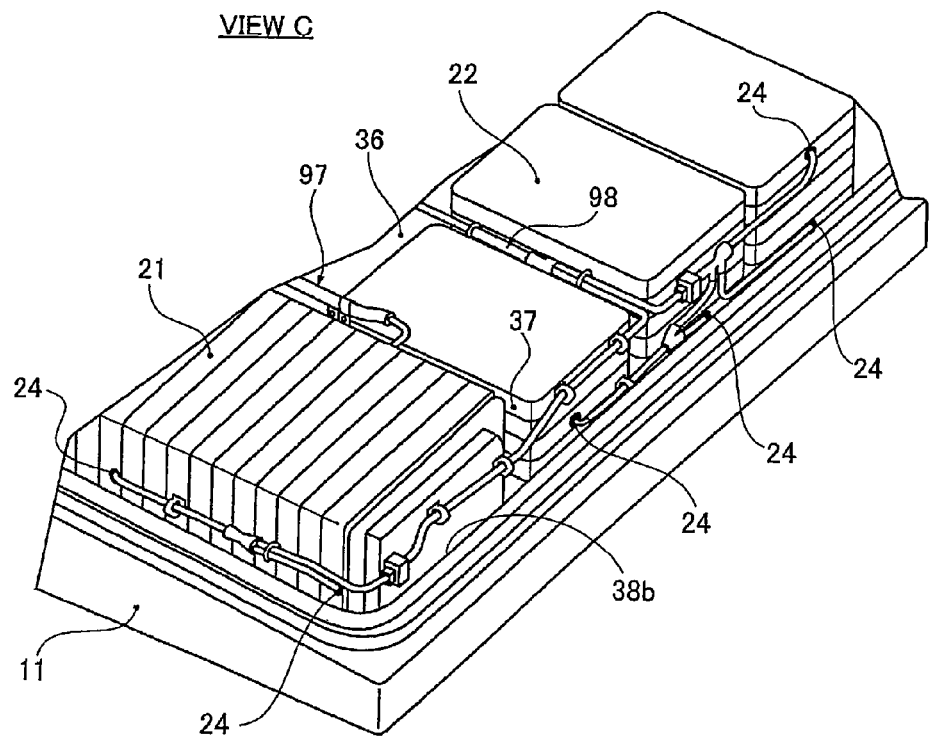
FIG. 11 is a perspective view illustrating the configuration of harness-connection for each pack component in the case internal space of the battery pack BP of the first embodiment, taken in the direction of the arrow C in FIG. 9.

As shown in FIGS. 10-11, temperature measuring junctions 24 are attached onto side faces of peripheries of battery modules 21, 22, and 23, facing the loop passage 38. For instance, two measuring junctions are attached onto the side face of the circumference of first battery module 21. Also, four measuring junctions in total are attached onto the side faces of the peripheries of second and third battery modules 22-23. In this manner, a plurality of measuring junctions are attached onto the side faces of the peripheries of the battery modules. By the way, such a thermo-couple temperature sensor has a reference junction (a cold junction) to which a reference voltage is applied through a lead wire, in addition to the temperature measuring junction 24.

As shown in FIG. 8, weak-electric harness 98 is constructed by binding temperature detection signal lines from the plurality of temperature measuring junctions 24 together, and configured to supply temperature detection signals for respective battery modules 21, 22, and 23 to the LB controller 6. LB controller 6 is configured to acquire battery-temperature information based on the temperature detection signals supplied thereto.

The operations/actions, provided by the battery pack structure for electric vehicles in the first embodiment, are divided into "CHARGING/DISCHARGING OPERATION OF BATTERY PACK BP", "INTERNAL TEMPERATURE MANAGEMENT/CONTROL ACTION OF BATTERY PACK BP", "HARNESS-CONNECTION WORK AMONG PACK COMPONENTS", and "HARNESS-CONNECTION WORK BETWEEN LB CONTROLLER AND EACH BATTERY MODULE", and explained every divided operations/actions.

[Charging/Discharging Operation of Battery Pack BP]

Battery pack BP, in which secondary batteries, such as lithium-ion batteries or the like, are mounted, is often compared to a fuel tank of a vehicle equipped with an engine. In the battery pack, a charge for increasing battery capacity and a discharge for decreasing battery capacity are repeated. The charging/discharging operation of battery pack BP is hereunder explained.

When quick-charging with the vehicle stopped at a quick-charging stand (a quick-charging station), first of all, a charging-port lid, located in the front end of the vehicle, is opened. Then, a quick-charging connector of the charging stand side is inserted into the quick-charging port 115 of the vehicle side. During quick-charging operation, a direct-current quick-charging voltage is supplied to the DC/DC converter of heavy-electric module 112 through the quick-charging harness 117, and then converted into a direct-current charging voltage by voltage-conversion of the DC/DC converter. The direct-current charging voltage is supplied via the charging/discharging harness 111 to the battery pack BP, and thus supplied to the battery cells of each of battery modules 21, 22, and 23 via the junction box 5 and the bus bars installed in the battery pack BP, for charging them.

When normal-charging with the vehicle parked at home, first of all, the charging-port lid, located in the front end of the vehicle, is opened. Then, a normal-charging connector of the home power-supply side is inserted into the normal-charging port 116 of the vehicle side. During normal-charging operation, an alternating-current normal-charging voltage is supplied to the charger of heavy-electric module 112 through the normal-charging harness 118, and then converted into a direct-current charging voltage by voltage-conversion and ac/dc conversion of the charger. The direct-current charging voltage is supplied via the charging/discharging harness 111 to the battery pack BP, and thus supplied to the battery cells of each of battery modules 21, 22, and 23 via the junction box 5 and the bus bars installed in the battery pack BP, for charging them.

During a power-running mode at which the vehicle is running by a driving force produced by the drive motor, a direct-current battery voltage from each of battery modules 21, 22, and 23 is discharged from the battery pack BP via the bus bars and the junction box 5. The discharged direct-current battery voltage is supplied to the DC/DC converter of heavy-electric module 112 via the charging/discharging harness 111, and then converted into a direct-current driving voltage by voltage-conversion of the DC/DC converter. The direct-current driving voltage is converted into an alternating-current driving voltage by dc/ac conversion of inverter 113. The alternating-current driving voltage is applied to the drive motor of motor drive unit 114, so as to rotate the drive motor.

With the drive motor put in regenerative operation during which the drive motor serves as a generator in the presence of a decelerating requirement, the drive motor carries out a power-generation function, for converting a rotational energy inputted from tires of drive road wheels into a generated energy. An alternating-current generated voltage, produced by the generated energy, is converted into a direct-current generated voltage by ac/dc conversion of inverter 113, and then converted into a direct-current charging voltage by voltage-conversion of the DC/DC converter of heavy-electric module 112. The direct-current charging voltage is supplied to the battery pack BP via the charging/discharging harness 111, and thus supplied to the battery cells of each of battery modules 21, 22, and 23 via the junction box 5 and the bus bars installed in the battery pack BP, for charging them.

[Internal Temperature Management/Control Action of Battery Pack BP]

The battery has a high temperature dependency, and thus the battery performance is different depending on whether the battery temperature is high or low. For the reasons discussed above, in order to maintain a high battery performance, it is necessary to manage or control the internal temperature (=battery temperature) of battery pack BP. The internal temperature management/control action of battery pack BP, reflecting the necessity discussed above, is hereunder explained in reference to FIGS. 5-6.

First, a temperature-adjustment control action, performed by means of temperature-adjustment controller 52, is discussed. For instance, when the internal temperature of battery pack BP exceeds a first set temperature due to continuous battery charging/discharging loads and/or high outside air temperatures, refrigerant is introduced into the evaporator 33 of temperature-adjustment air unit 3, and the blower fan 32 is rotated. Thereby, heat is removed from the air passing through the evaporator 33 and thus cold air is created. By circulation of the cold air in the case internal space, in which the first battery module 21, the second battery module 22, and the third battery module 23 are mounted, the internal temperature (=battery temperature) of battery pack BP can be reduced.

In contrast, when the internal temperature of battery pack BP becomes less than a second set temperature due to cold-air circulation and/or low outside air temperatures, the PTC heater of the temperature-adjustment air unit is energized, and the blower fan is rotated. Thereby, heat is added to the air passing through the PTC heater and thus hot air is created. By circulation of the warm air in the case internal space, in which the first battery module 21, the second battery module 22, and the third battery module 23 are mounted, the internal temperature (=battery temperature) of battery pack BP can be risen.

As discussed above, by performing temperature-adjustment control for battery pack BP, the internal temperature of battery pack BP can be maintained in a temperature range from the first set temperature to the second set temperature, within which a high battery performance can be ensured. At this time, it is important to circulate temperature-adjusting air equally smoothly throughout the case internal space without any space having a lack in the quantity of temperature-adjusting air circulation. This is because the internal temperature control of battery pack BP is aimed at maintaining the temperatures of first, second, and third battery modules 21, 22, and 23, which modules are mounted in the case internal space, in the battery temperature range that ensures a high battery performance. The operation of temperature-adjusting air in the case internal space is hereunder described.

As indicated by the arrow D in FIG. 5, temperature-adjusting air (cold air and/or hot air), blown off from the blowout hole of temperature-adjustment air unit 3, flows through the central passage 36 from the front of the vehicle toward the rear. Then, as indicated by the arrows E, E in FIG. 5, the flow from the central passage 36 is distributed into two opposite sides in the vehicle width direction by way of the intersecting passage 37 that intersects with the central passage 36. That is, the T-shaped passage, constructed by the central passage 36 and the intersecting passage 37, functions as a main passage for the temperature-adjusting airflow. The temperature-adjusting air, which flows through the T-shaped passage, also branches off in many directions in the middle of the flow. As described hereunder, heat is exchanged among the branched flows and each of first, second, and third battery modules 21, 22, and 23.

The heat-exchange of the first battery module 21 is performed by heat-transfer with the temperature-adjusting air flows indicated by the arrows E, E in FIG. 5 and distributed into the two opposite sides in the vehicle width direction, and the temperature-adjusting air flows indicated by the arrows F in FIG. 5 and flowing through the apertures among the battery cells upright-stacked and directed from the front of the vehicle toward the rear.

The heat-exchange of the second battery module 22 and the heat-exchange of the third battery module 23 are performed by heat-transfer with the temperature-adjusting air flow indicated by the arrow D in FIG. 5 and flowing through the central passage 36 and directed from the front of the vehicle toward the rear, and the temperature-adjusting air flows indicated by the arrows E, E in FIG. 5 and distributed into the two opposite sides in the vehicle width direction. Additionally, the heat exchanges are performed by heat-transfer with the temperature-adjusting air flows indicated by the arrows G, G in FIG. 5 and flowing through the mounting interval between the one set of 4 pieces of flat-stacked battery cell and the one set of 5 pieces of flat-stacked battery cell and distributed into the two opposite sides in the vehicle width direction. Furthermore, the heat-exchanges are performed by heat-transfer with the temperature-adjusting air flows indicated by the arrows H, H in FIG. 5 and flowing through the mounting interval between the one set of 5 pieces of flat-stacked battery cell and the other set of 5 pieces of flat-stacked battery cell and distributed into the two opposite sides in the vehicle width direction.

As discussed above, the air, which finished heat-exchange with each of first, second, and third battery modules 21, 22, and 23, flows into the loop passage 38 defined in the circumference of the internal space. As indicated by the arrows I, I in FIG. 5, the heat-exchanged air, flown into the loop passage 38, is distributed into the opposite sides in the vehicle width direction by the rearward passage part, facing the rear of the vehicle and arranged along the first battery module 21. Thereafter, as indicated by the arrows J, J in FIG. 5, the heat-exchanged air, distributed into the opposite sides, further flows through two parallel passage parts arranged on both sides and directed from the rear of the vehicle toward the front. Then, the heat-exchanged air flows are merged together at the forward passage part, facing the front of the vehicle, and thus returned to the suction side of temperature-adjustment air unit 3.

Next, the operation that creates cold air or hot air from the heat-exchanged air, returned to the unit suction side, within the temperature-adjustment air unit 3, is hereunder explained. As indicated by the arrow in FIG. 6, the heat-exchanged air returned to the unit suction side passes through the evaporator 33 and the blower fan 32, both installed in the unit case 31, and then passes through the PTC heater 34, installed in the temperature-adjusting air duct 35, and thus blown off from the duct blowout hole into the central passage 36. At this time, under a condition where refrigerant is introduced into the evaporator 33, and the PTC heater 34 is de-energized, and the blower fan 32 is rotated, heat is removed from the heat-exchanged air by means of the evaporator in a manner so as to create cold air. Conversely under a condition where introduction of refrigerant into the evaporator 33 is stopped, the PTC heater 34 is energized, and the blower fan 32 is rotated, heat is added from the PTC heater 34 to the heat-exchanged air passing through the PTC heater 34, in a manner so as to create hot air.

As discussed above, the first embodiment adopts a specified layout/configuration that the central passage 36, the intersecting passage 37, and the loop passage 38 are formed or defined in the case internal space, and the temperature-adjustment air unit 3 is laid out at a position at which the heat-exchanged air, merged together from the double air-flow systems, is sucked into the unit and the created temperature-adjusting air is blown off into the central passage 36.

By virtue of the specified layout/configuration, when controlling the internal temperature of battery pack BP by temperature-adjusting air (cold air, hot air), temperature-adjusting air can be circulated equally smoothly throughout the case internal space without any space having a lack in the quantity of temperature-adjusting air circulation.

Hence, it is possible to enhance the control accuracy and the control responsiveness in temperature-adjustment control of battery pack BP, thus suppressing an internal-temperature variation range of battery pack BP as narrow a range as possible. In other words, it is possible to maintain the internal temperature of battery pack BP in an appropriate temperature range that ensures an intended high battery performance.

[Harness-Connection Work Among Pack Components]

Figure 12:
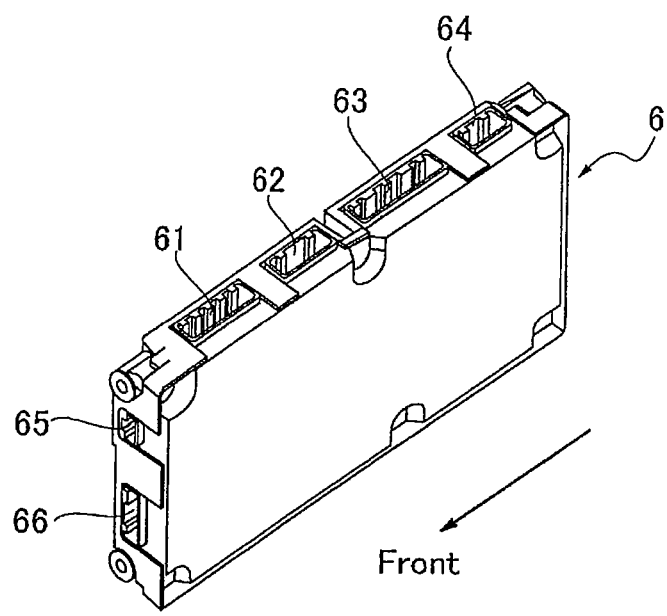
FIG. 12 is a perspective view illustrating an LB controller mounted in the battery pack BP of the first embodiment.

In the battery pack BP, the pack components mounted in the case internal space, are harness-connected each other, but it is necessary to simplify such a harness-connection work as much as possible. The harness-connection work among the pack components, reflecting the necessity discussed above, is hereunder explained. As shown in FIG. 12, LB controller 6 has four heavy-electric connector terminals 61, 62, 63, and 64, and two weak-electric connector terminals 65 and 66. Weak-electric harness 96, heavy-electric harness 97, and weak-electric harness 98 are connected to these connector terminals 61, 62, 63, 64, 65, and 66.

First, the harness-connection work with the weak-electric harness 96 is explained. As shown in FIG. 9, weak-electric harness 96 is wired along the straight passage part 38a of loop passage 38, and then the weak-electric harness 96 is fixed at a plurality of points by means of fixtures. Thereafter, one of connectors, installed on both ends of weak-electric harness 96, is connected to the connector of the side of junction box 5. As seen in FIG. 10, the other of the connectors, installed on both ends of weak-electric harness 96, is inserted into the weak-electric connector terminal 66. Thereby, junction box 5 and LB controller 6 are connected to each other via the weak-electric harness 96.

The harness-connection work with the heavy-electric harness 97 is explained. As shown in FIG. 9, heavy-electric harness 97 is wired along the intersecting passage 37, and then the heavy-electric harness 97 is fixed at a plurality of points by means of fixtures. Thereafter, one of connectors, installed on both ends of heavy-electric harness 97, is connected to connectors installed on ends of respective voltage detection lines 97a, 97b, and 97c. As seen in FIG. 10, the other of connectors, installed on both ends of heavy-electric harness 97, is inserted into four heavy-electric connector terminals 61, 62, 63, and 64. Thereby, LB controller 6 and each of battery modules 21, 22, and 23 are connected to each other via the heavy-electric harness 97.

The harness-connection work with the weak-electric harness 98 is explained. As shown in FIG. 9, weak-electric harness 98 is wired along the straight passage parts 38a-38b of loop passage 38, both extending in the fore-and-aft direction of the vehicle, and also wired along the stepped faces of second and third battery modules 22-23 in the vehicle width direction. Then, weak-electric harness 98 is fixed at a plurality of points by means of fixtures. Thereafter, one of connectors, installed on both ends of weak-electric harness 98, is connected to connectors installed on ends of respective temperature detection signal lines. The other of connectors, installed on both ends of weak-electric harness 98 is inserted into the weak-electric connector terminal 65 shown in FIG. 12. Thereby, LB controller 6 and each of battery modules 21, 22, and 23 are connected to each other via the weak-electric harness 98.

In this manner, all of the harness-connection works for weak-electric harness 96, heavy-electric harness 97, and weak-electric harness 98 are done by harness-wiring, harness-fixing, and connection between connectors. In particular, the harness-wiring of these works can be simplified. That is, regarding weak-electric harness 96, the short harness is only wired straight along the straight passage part 38a of loop passage 38. Regarding heavy-electric harness 97, the short harness is only wired straight along the intersecting passage 37. Regarding weak-electric harness 98, the harness is only wired into an H-shape in the plan view along the outer peripheral surfaces of battery modules 21, 22, and 23. That is, complicated harness-wiring that each of the harnesses has to be bent complicatedly along corners and grooves and the like is not required. Thus, it is possible to improve the harness durability as well as the harness-wiring workability, as compared to bent-harness routing along bent paths.

[Harness-Connection Work Between LB Controller and Each Battery Module]

In the harness-connection performed in the case internal space, it is necessary to simplify the harness-wiring work, and additionally to wire the harnesses such that the harnesses wired in the temperature-adjustment air passages do not act as a factor that disturbs the temperature-adjusting air flow. The harness-connection work between the LB controller and each of the battery modules, reflecting the necessity discussed above, is hereunder explained.

The first embodiment adopts a specified configuration that each of battery modules 21, 22, and 23 and LB controller 6, which are arranged at respective positions facing one common intersecting passage 37 of the temperature-adjustment air passages, are connected to each other via the heavy-electric harness 97 wired along the one common intersecting passage 37 (see FIG. 9).

By virtue of this configuration, as shown in FIG. 9, heavy-electric harness 97, wired in the intersecting passage 37 of the temperature-adjustment air passages, is configured as a harness extending straight along the temperature-adjusting air flow through the intersecting passage 37. Thus, it is possible to suppress the passage resistance of the temperature-adjustment air passages low, as compared to the bent-harness routing that the harness is bent to disturb the temperature-adjusting air flow. Hence, it is possible to ensure smooth flow of temperature-adjusting air.

Therefore, as discussed previously, in the harness-connection between LB controller 6 and each of battery modules 21, 22, and 23, it is possible to ensure smooth flow of temperature-adjusting air, while improving the harness-wiring workability and the harness durability.

In the first embodiment, the plurality of battery modules 21, 22, and 23 are equipped with respective external bus bars 90a, 90b, and 90c, each of which is provided for connecting between terminals of a plurality of battery cells constructing each battery module 21, 22, and 23 and for binding them together. Additionally, the embodiment adopts a configuration of bus-bar connection that LB controller 6 and each of the bus-bar ends of the plurality of external bus bars 90a, 90b, and 90c, facing the intersecting passage 37, are connected to each other via the heavy-electric harness 97 wired along the intersecting passage 37 (see FIG. 9).

For instance, assume that a comparative example adopts a configuration that harnesses are used for connecting between terminals of a plurality of battery cells constructing each battery module and for binding them together. In the case of the comparative example, temperature-adjustment air passages configured along the plurality of battery modules are blocked up by a large number of harnesses used for connecting between battery-cell terminals and for binding them together. Thus, a temperature-adjusting air flow passage cross-sectional area becomes narrow. In contrast to the above, the embodiment is configured such that the plurality of external bus bars 90a, 90b, and 90c, each of which is constructed by a thin electrically conductive plate, are used for connecting between terminals of a plurality of battery cells constructing each battery module and for binding them together. Hence, in comparison with the use of harnesses, the flow passage cross-sectional area of each of the central passage 36 and the intersecting passage 37 defined along the battery modules 21, 22, and 23 becomes wider, thus ensuring a sufficient quantity of temperature-adjusting air flowing through the temperature-adjustment air passages.

In the case of the above-mentioned comparative example, harnesses fulfill a function for bundling the number of battery-cell terminals, and thus harness-connection with the farthest battery cell, located far away from the LB controller 6, is required, and as a result the harness-wiring length becomes longer. In contrast to the above, external bus bars 90a, 90b, and 90c fulfill a function for bundling the number of battery-cell terminals, and LB controller 6 and each of the bus-bar ends of external bus bars 90a, 90b, and 90c, facing the intersecting passage 37 are connected to each other via the wired heavy-electric harness 97. Hence, the length of intersecting passage 37 is enough for the length of heavy-electric harness 97, thus suppressing the harness-wiring length shorter.

The first embodiment adopts a configuration that the temperature-adjustment air passages are configured to have the intersecting passage 37 for distributing the flow from the central passage 36, into which temperature-adjusting air is blown, to both sides in the vehicle width direction, and additionally the intersecting passage 37 is configured as the common passage part along which heavy-electric harness 97 is wired.

In the temperature-adjusting air case-internal-space circulation action as discussed above, the T-shaped passage, constructed by the central passage 36 and the intersecting passage 37, serves as a main passage for the temperature-adjusting air flow. When comparing the case where heavy-electric harness 97 is wired in the central passage 36 of these two passages 36-37 with the case where heavy-electric harness 97 is wired in the intersecting passage 37, the former case where the heavy-electric harness is wired in the central passage 36 has a tendency for a drop of the case-internal-space circulation efficiency to be increased. In contrast, the intersecting passage 37 serves as the common passage part along which heavy-electric harness 97 is wired. Hence, it is possible to suppress a drop of the case-internal-space circulation efficiency to a minimum.

In the first embodiment, the internal space of battery pack case 1 is classified into three-split rectangular regions, namely, the first split rectangular region 71 in which the first battery module 21 is mounted, the second split rectangular region 72 in which the second battery module 22 is mounted, and the third split rectangular region 73 in which the third battery module 23 is mounted, by the T-shaped passage constructed by the central passage 36 and the intersecting passage 37. The first embodiment adopts a layout/configuration that LB controller 6 is arranged upright in the first split rectangular region 71 of the plurality of split rectangular regions 71, 72, and 73, the first split rectangular region 71 being configured to mount the first battery module 21, constructed by battery cells upright-stacked in the vehicle width direction (see FIG. 7).

For instance, as a comparative example, assume that the internal space of a battery pack case is split into a plurality of split rectangular regions equipped with only a plurality of battery modules, and an LB controller is arranged in a certain region outside of the plurality of split rectangular regions. In the case of the comparative example, on the assumption that the split rectangular regions are configured and split to ensure temperature-adjustment air passages, the LB controller, arranged in the certain region outside of the split rectangular regions, acts as a factor that narrows the temperature-adjustment air passages. In contrast, LB controller 6 is arranged in the first split rectangular regions 71 in which the first battery module 21 is mounted, and thus the LB controller 6 does not act as a factor that narrows the temperature-adjusting air flow passage cross-sectional area. Hence, it is possible to ensure the flow rate of temperature-adjusting air flowing through the case internal space.

For instance, as a comparative example, assume that an LB controller is arranged in a plurality of split rectangular regions, but located in a flat-stacked state. In the case of the comparative example, the occupation area occupied by the flat-stacked LB controller widens, and the battery mounting space becomes narrow by just much that. In contrast, LB controller 6 is arranged and upright-stacked together with the battery cells, and thus the occupation area, occupied by the LB controller 6, can be suppressed narrowly. Hence, it is possible to ensure a maximum battery mounting space, while mounting the LB controller 6 in the battery module mounting region 7 of the internal space of battery pack case 1.

In the first embodiment, the height of the first battery module 21, mounted in the internal space of battery pack case 1, is dimensioned to be higher than that of each of the second and third battery modules 22-23. The first embodiment adopts a configuration that heavy-electric harness 97 is wired along a specified one of three side faces of battery modules 21, 22, and 23, facing the intersecting passage 37, the specified one corresponding to an upper part of the side face of the first battery module 21, further protruding upward from top faces of second and third battery modules 22-23 (see FIG. 10).

For instance, assume that a comparative example adopts a configuration that a harness is wired in a clearance space defined between opposed faces of a first battery module and each of second and third battery modules. In the case of the comparative example, the clearance space, defined by the opposed faces of the battery modules, serves as a temperature-adjustment air passage. Thus, when a harness is wired in such a temperature-adjustment air passage, the cross-sectional area of the temperature-adjustment air passage becomes narrow by at least a cross-sectional area of the harness. In contrast, heavy-electric harness 97 is wired along the upper part of the side face of the first battery module 21, further protruding upward from the top faces of second and third battery modules 22-23. Hence, heavy-electric harness 97 does not act as a factor that narrows the flow passage cross-sectional area of the intersecting passage 37 through which temperature-adjusting air flows, thus ensuring a flow rate of temperature-adjusting air flowing through the case internal space.

Effects are hereunder explained.

The battery pack structure for electric vehicles of the first embodiment can provide the following effects.

(1) In a battery pack structure for electric vehicles that a plurality of battery modules 21, 22, and 23, each constructed by a battery cell assembly, and a battery controller (LB controller 6) for battery management are mounted in an internal space of a battery pack case 1, a first one of a plurality of clearances, ensured when the plurality of battery modules 21, 22, and 23 are mounted in the internal space of the battery pack case 1, which first clearance extends in a first direction, is configured as a first temperature-adjustment air passage (central passage 36) through which temperature-adjusting air flows, and a second one of the clearances, which second clearance is located downstream of the first temperature-adjustment air passage (central passage 36) and extends in a second direction different from the first direction, is configured as a second temperature-adjustment air passage (intersecting passage 37) through which the temperature-adjusting air flows. Additionally, the battery controller (LB controller 6) is arranged at a position facing the second temperature-adjustment air passage (intersecting passage 37). Furthermore, a harness (heavy-electric harness 97) for connecting between each detection line terminal (external bus bars 90a, 90b, and 90c) from the plurality of battery modules 21, 22, and 23 and the battery controller (LB controller 6), and one end of the harness (heavy-electric harness 97), which harness end is configured as harness terminals (connectors X, Y, and Z) connected to the respective detection line terminals (external bus bars 90a, 90b, and 90c), are wired along and arranged in the second temperature-adjustment air passage (intersecting passage 37).

Therefore, when connecting the plurality of battery modules 21, 22, and 23 and the battery controller (LB controller 6) to each other via the harness, it is possible to ensure smooth flow of temperature-adjusting air, while improving both the harness-wiring workability and the harness durability.

(2) The plurality of battery modules 21, 22, and 23 are equipped with respective bus bars (respective external bus bars 90a, 90b, and 90c), each of which is provided for connecting between terminals of a plurality of battery cells constructing each of the battery modules 21, 22, and 23 and for binding them together. Additionally, the battery controller (LB controller 6) and each of bus-bar ends of the plurality of bus bars (external bus bars 90a, 90b, and 90c), facing the second temperature-adjustment air passage (intersecting passage 37) and serving as the detection line terminals, are connected to each other via the harness (heavy-electric harness 97) wired along and arranged in the second temperature-adjustment air passage (intersecting passage 37).

Therefore, in addition to the effect (1), it is possible to ensure the flow rate of temperature-adjusting air flowing through the temperature-adjustment air passages (central passage 36 and intersecting passage 37) along each of the battery modules 21, 22, and 23, and also to suppress the wiring length of the harness (heavy-electric harness 97) shorter.

(3) A central passage 36, into which the temperature-adjusting air is blown, is configured as the first temperature-adjustment air passage, and additionally an intersecting passage 37 for distributing a flow from the central passage 36 to both sides in a vehicle width direction is configured as the second temperature-adjustment air passage along which the harness (heavy-electric harness 97) is wired.

Therefore, in addition to the effect (2), it is possible to suppress a drop in the case-internal-space circulation efficiency to a minimum, as compared to the case where the harness (heavy-electric harness 97) is wired in the central passage 36 into which temperature-adjusting air before heat-exchange is first introduced.

(4) The internal space of the battery pack case 1 is classified into three-split rectangular regions, comprised of a first split rectangular region 71 in which a first battery module 21 of the plurality of battery modules is mounted, a second split rectangular region 72 in which the second battery module 22 is mounted, and a third split rectangular region 73 in which the third battery module 23 is mounted, by a T-shaped passage constructed by the central passage 36 and the intersecting passage 37. Additionally, the battery controller (LB controller 6) is arranged upright in the first split rectangular region 71 of the plurality of split rectangular regions, the first split rectangular region being configured to mount the first battery module 21, constructed by the battery cells upright-stacked in the vehicle width direction.

Therefore, in addition to the effect (3), it is possible to ensure the flow rate of temperature-adjusting air flowing through the case internal space, since the battery controller (LB controller 6) does not act as a factor that narrows the temperature-adjusting air flow passage cross-sectional area, and also to ensure a maximum battery mounting space, while mounting the battery controller (LB controller 6) in the battery module mounting region 7.

(5) A height of the first battery module 21, mounted in the internal space of the battery pack case 1, is dimensioned to be higher than that of each of the second and third battery modules 22-23. Additionally, the harness (heavy-electric harness 97) is wired along a specified one of three side faces of the battery modules 21, 22, and 23, facing the intersecting passage 37, the specified one corresponding to an upper part of the side face of the first battery module 21, further protruding upward from top faces of the second and third battery modules 22-23.

Therefore, in addition to the effect (4), it is possible to ensure a flow rate of temperature-adjusting air flowing through the case internal space, since the harness (heavy-electric harness 97) does not act as a factor that narrows the flow passage cross-sectional area of the intersecting passage 37 through which temperature-adjusting air flows.

While the foregoing is a description of the battery pack structure for electric vehicles in the first embodiment carried out the invention, it will be understood that the invention is not limited to the first embodiment shown and described herein, but that various changes and modifications may be made without departing from the scope or spirit of this invention as defined by the following claims.

In the first embodiment, as a plurality of battery modules 2, three split battery modules 21, 22, and 23 are exemplified such that these battery modules are mounted in respective rectangular regions 71, 72, and 73 split each other, but two-split battery modules may be used as a plurality of battery modules. In lieu thereof, four or more split battery modules may be used as a plurality of battery modules. In the case of such multiple-splitting, a splitting technique is not limited to the first embodiment that adopts a splitting technique with a T-shaped passage. In lieu thereof, various splitting techniques may be utilized.

In the first embodiment, it is exemplified that the case internal space is partitioned into two regions in the fore-and-aft direction of the vehicle, one being a battery module mounting region 7 and the other being an electrical equipment mounting region 8, and a plurality of battery modules 21, 22, and 23 and LB controller 6 are arranged in the battery module mounting region 7, but the LB controller may be arranged in the electrical equipment mounting region. In lieu thereof, a plurality of battery modules and an LB controller may be arranged without partitioning the case internal space into a battery module mounting region and an electrical equipment mounting region.

In the first embodiment, it is exemplified that the intersecting passage 37 is configured as the common passage part along which heavy-electric harness 97 is wired, but the common passage part along which the harness is wired is not limited to such an intersecting passage. Any straight passage part constructing part of temperature-adjustment air passages, such as a straight passage extending in the vehicle width direction or in the fore-and-aft direction of the vehicle, may be used as the common passage part.

In the first embodiment, it is exemplified that the battery pack structure of the invention is applied to one-box type electric vehicle employing only a drive motor as a drive source for running, but the battery pack structure for electric vehicles of the invention may be applied to various types of electric vehicles as well as a one-box type, such as a sedan type, a wagon type, an SUV type, and the like. Furthermore, it may be applied to a hybrid type of electric vehicle (a hybrid electric vehicle) employing both a drive motor and an engine as a drive source for running. That is, the battery pack structure of the invention may be applied to any type of electric vehicle employing a battery pack on which battery modules, a junction box, and a battery controller are mounted.

The invention claimed is:

1. A battery pack structure for electric vehicles that a plurality of battery modules, each constructed by a battery cell assembly, and a battery controller for battery management are mounted in an internal space of a battery pack case, characterized in that
   a first one of a plurality of clearances, ensured when the plurality of battery modules are mounted in the internal space of the battery pack case, which first clearance extends in a first direction, is configured as a first temperature-adjustment air passage through which temperature-adjusting air flows, and a second one of the clearances, which second clearance is located downstream of the first temperature-adjustment air passage and extends in a second direction different from the first direction, is configured as a second temperature-adjustment air passage through which the temperature-adjusting air flows, in that the battery controller is arranged at a position facing the second temperature-adjustment air passage, and in that a harness for connecting between each detection line terminal from the plurality of battery modules and the battery controller, and one end of the harness, which harness end is configured as harness terminals connected to the respective detection line terminals, are wired along and arranged in the second temperature-adjustment air passage.

2. A battery pack structure for electric vehicles as recited in claim 1, wherein:
   the plurality of battery modules are equipped with respective bus bars, each of which is provided for connecting between terminals of a plurality of battery cells constructing each of the battery modules and for binding them together; and
   the battery controller and each of bus-bar ends of the plurality of bus bars, facing the second temperature-adjustment air passage and serving as the detection line terminals, are connected to each other via the harness wired along the second temperature-adjustment air passage.

3. A battery pack structure for electric vehicles as recited in claim 2, wherein:
   a central passage, into which the temperature-adjusting air is blown, is configured as the first temperature-adjustment air passage; and
   an intersecting passage for distributing a flow from the central passage to both sides in a vehicle width direction is configured as the second temperature-adjustment air passage along which the harness is wired.

4. A battery pack structure for electric vehicles as recited in claim 3, wherein:
   the internal space of the battery pack case is classified into three-split rectangular regions, comprised of a first split rectangular region in which a first battery module of the plurality of battery modules is mounted, a second split rectangular region in which the second battery module is mounted, and a third split rectangular region in which the third battery module is mounted, by a T-shaped passage constructed by the central passage and the intersecting passage; and
   the battery controller is arranged upright in the first split rectangular region of the plurality of split rectangular regions, the first split rectangular region being configured to mount the first battery module, constructed by the battery cells upright-stacked in the vehicle width direction.

5. A battery pack structure for electric vehicles as recited in claim 4, wherein:
   a height of the first battery module, mounted in the internal space of the battery pack case, is dimensioned to be higher than that of each of the second and third battery modules; and
   the harness, via which the battery controller and each of the bus-bar ends are connected to each other, is wired along a specified one of three side faces of the battery modules, facing the intersecting passage, the specified one corresponding to an upper part of the side face of the first battery module, further protruding upward from top faces of the second and third battery modules.

* * * * *